Aug. 11, 1970   M. S. REISS   3,523,817
ANTI-STICKING ENAMELED COOKING UTENSIL

Filed July 17, 1967   2 Sheets-Sheet 2

INVENTOR
MAX. S. REISS

BY
Bean, Brooke, Buckley & Bean
ATTORNEYS

3,523,817
ANTI-STICKING ENAMELED COOKING UTENSIL
Max S. Reiss, Wheeling, W. Va., assignor to Lisk-Savory Corporation, Buffalo, N.Y.
Filed July 17, 1967, Ser. No. 653,923
Int. Cl. B23b *15/00;* C23d
U.S. Cl. 117—129      2 Claims

ABSTRACT OF THE DISCLOSURE

A cooking utensil having an enamel coating at least on its bottom surface. The coating is formed by application of a vitreous material which upon firing, adheres to the utensil and which, upon cooling, becomes devitrified.

BRIEF SUMMARY OF THE INVENTION

The present invention is directed to the utilization of a devitrified enamel coating applied to the botom of a cooking utensil such as a pot or a pan. Ordinary enamel coatings utilized for cooking utensils are of a vitreous nature and, as a consequence, are prone to sticking to the heating elements of a stove if the cooking utensil is inadvertently permitted to become dry so that its bottom is not cooled by the contents of the utensil sufficiently to prevent the enamel coating in contact with the heating element from attaining a temperature at or near the temperature of the heating element. The result of such sticking is to transfer the vitreous enamel coating to the heating element leading not only to destruction or damage of the utensil but of the heating element as well.

In the present invention, the enamel coating is of a devitrified nature and the material, instead of being a glass or vitreous coating is an ordered crystalline structure and is a solid of sufficiently high melting point that transfer and sticking will not occur under the circumstances described above. The reason that an ordinary vitreous enamel coating undergoes the phenomenon of transfer and sticking is that a vitreous enamel, not being an ordered crystalline structure (i.e. devitrified) does not exhibit a definite or fixed melting point whereat the material makes the transition between a solid and a liquid but, instead, undergoes a gradual and progressive softening as its temperature is increased. That is to say, vitreous coatings are characterized by the fact that they act in the fashion of a liquid having a very high viscosity at ordinary temperatures but becoming less viscous as their temperature is increased. Ordinary vitreous enamel coatings become soft enough upon attainment of these temperature at which the ordinary heating elements of a stove operate to become sufficiently tacky as to transfer to the body of the heating element and stick thereto causing the damage or destruction as aforesaid.

The present invention, then, is concerned primarily with an enamel coating applied to the bottom of a cooking utensil or pan, and, in particular, is concerned with the process and article involving the utilization of a devitrified enamel coating as opposed to the ordinary vitreous type of coating applied to such utensils.

Essentially, this invention involves the utilization of a pulverized glass frit which preferably is formed into a conventional slip for application to the surface of the enamel-ware and which slip is then permitted to dry prior to firing. During the firing process, the glass frit content of the slip will soften sufficiently at the firing temperature to adhere to and coat the surface of the utensil to which it is applied but the present invention differs from the prior art in that upon cooling, the coating becomes devitrified so that upon re-heating to the same temperature, the devitrified coating remains a solid, i.e., has a melting point higher than the firing temperature.

As will be readily appreciated by those skilled in the art, a great many substances will meet the conditions above set forth, namely, that they are applied as described and will become devitrified upon cooling. Consequently, it is not within the purview of this invention to specify a particular composition for arriving at a devitrified enamel coating for the bottom of a cooking utensil but rather to describe certain specific examples of how this end result may be achieved.

Figure 1:
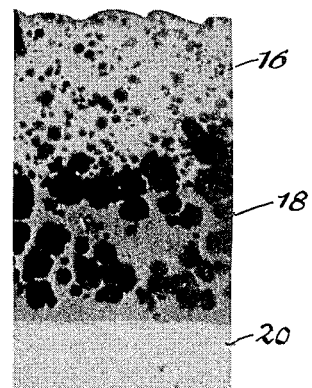
FIG. 1 is a photomicrograph taken sectionally through a conventional vitreous enamel coating.

The devitrified enamel coatings according to the present invention are, in general, of matte appearance due to their homogenous and ordered crystalline nature. By crystalline nature is meant a uniform ordered crystalline mass as opposed to a random and sporadic crystalline structure as is exemplified by vitreous materials. To illustrate the physical differences between a vitreous enamel coating conventionally utilized in this particular art, attention is directed to FIG. 1 which is a photomicrograph taken sectionally through such a coating. FIG. 2, by comparison, and to illustrate the nature of the crystalline structure according to the present invention, is a photomicrograph taken through a section of an enamel coating according to the present invention.

EXAMPLE I

Table I

| | Percent weight |
|---|---|
| $SiO_2$ | 30–40 |
| $Al_2O_3$ | 20–30 |
| $Na_2O$ | 10–15 |
| $B_2O_3$ | 5–10 |
| $K_2O$ | 2–5 |
| $CaF_2$ | 9–11 |
| $CaO$ | 9–11 |
| $Ca_3(PO_4)_2$ | 10 |
| $F_2$ | 10 |

A glass frit was prepared from a glass having a nominal composition according to Table I. The frit is prepared by conventional smelting techniques, as for example by heating in a smelter at a temperature of 1800–2400° F. and dispersing the molten material upon discharge by an air jet and collection in a vat of water. The resultant frit was charged into a ball mill together with the following materials based by weight upon 100 parts of frit:

| | |
|---|---|
| Red Label Clay | 6 |
| Alumina | 5 |
| Silica (400 mesh) | 8 |
| Black oxide pigment (6710) | 4 |
| Bentonite | .25 |
| Setting up agent (65) | .25 |
| Urea | 1 |

The resultant slip is applied on top of a conventional ground coat, the details of which form no part of the present invention and which ground cost serves the purpose of obtaining a better adhesion of the entire enamel structure to the steel body of the utensil. After application of the slip, the utensil was fired at a temperature of 1540° F.

EXAMPLE II

By the process described in Example I, a frit was prepared from the following glass composition:

Table II

| | Percent weight |
|---|---|
| $SiO_2$ | 60–70 |
| ZnO | 9–12 |
| $Al_2O_3$ | 1 |
| $Na_2O$ | 5–15 |
| $B_2O_3$ | 1 |
| CaO | 5–15 |
| MgO | 1 |

The frit was then ground in a ball mill together with the following additional mill charge based upon 100 parts of frit:

| | |
|---|---|
| Red Label Clay | 7 |
| Alumina | 8 |
| Silica | 8 |
| Bentonite | .25 |
| Setting up agent (65) | .25 |
| Urea | 1 |
| Black oxide pigment (6710) | 4 |

As in Example I, the resultant slip was applied and then fired at 1540° F.

EXAMPLE III

The frit of Example II was combined and ground with the following mill charge based upon 100 parts of frit:

| | |
|---|---|
| 22 Clay | 7 |
| Alumina | 2 |
| Silica | 2 |
| Black oxide pigment (9200) | 10 |
| Sodium nitrite | .25 |
| Bentonite | .25 |
| Gum tragacanth | .25 |

The resultant slip was applied and fired at 1540° F.

The coatings obtained by the procedures of the above Examples were of the type shown in FIG. 2. In this figure, the steel base 10 is provided with a conventional ground coat 12 upon which the coating 14 according to this invention is applied. The crystalline devitrified nature of the coating 14 is readily apparent.

Figure 2:
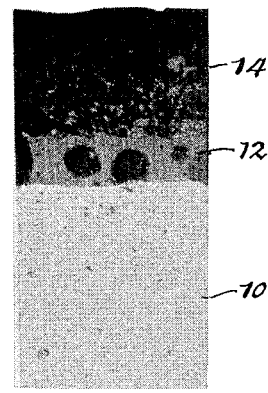
FIG. 2 is a photomicrograph taken through a section of an enamel coating according to the present invention.

By comparison, FIG. 1 shows a conventional slip prepared from a mill charge of 100 parts titania frit, 5 parts clay, .2 part potassium carbonate, .2 part bentonite and 1 part $TiO_2$, applied and fired on a steel base as in FIG. 2. FIG. 1 illustrates the vitreous nature of the conventional coating 16, reference numerals 18 and 20 respectively indicating the ground coat and the steel base.

Figure 3:
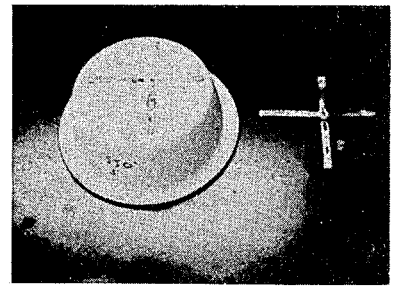
FIGS. 3 and 4 are views showing respectively the effects of overheating a conventional coating and a coating according to this invention while in contact with metal strips in the form of a cross.
Figure 4:
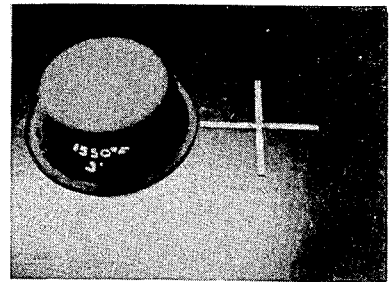

The devitrified coating of the above Examples I–III (FIG. 2) and the conventional coating (FIG. 1) were tested in an oven at a temperature of 1550° F. The coated utensils in each case were placed upon crosses of heat resisting metal (Inconel) within the oven and were subjected to the oven atmosphere for three minutes. The Inconel cross was fused to the bottom of the conventionally coated utensil whereas not sticking occurred in the case of the utensil coated according to the present invention. The results are shown respectively in FIGS. 3 and 4. For utensils coated according to this invention, the time cycle was then increased to six minutes at the same temperature. No sticking occurred. The time was then increased to twenty-five minutes with no sticking.

I claim:

1. The method of making a cooking utensil having an enamel coating characterized by its resistance to sticking or transfer to a heating element comprising the steps of: applying a ground coat to the undersurface of a metallic body having a bottom wall structure,
preparing a glass frit and then forming a slip from said glass capable of devitrifying upon cooling after firing at a temperature of at least 1500° F.
applying the slip to the ground coat,
firing the utensil at a temperature of at least about 1500° F. to adhere the slip to the ground coat, and
allowing the utensil to cool so that the glass becomes devitrified,
said frit being prepared from a glass having the following nominal composition:

| | Percent weight |
|---|---|
| $SiO_2$ | 30–40 |
| $Al_2O_3$ | 20–30 |
| $Na_2O$ | 10–15 |
| $B_2O_3$ | 5–10 |
| $K_2O$ | 2–5 |
| $CaF_2$ | 9–11 |
| CaO | 9–11 |
| $Ca_3(PO_4)_2$ | 10 |
| $F_2$ | 10 |

2. The method of making a cooking utensil having an enamel coating characterized by its resistance to sticking or transfer to a heating element comprising the steps of: applying a ground coat to the undersurface of a metallic body having a bottom wall structure,
preparing a glass frit and then forming a slip from said glass capable of devitrifying upon cooling after firing at a temperature of at least 1500° F.,
applying the slip to the ground coat,
firing the utensil at a temperature of at least about 1500° F. to adhere the slip to the ground coat, and
allowing the utensil to cool so that the glass becomes devitrified,
said frit being prepared from a glass having the following nominal composition:

| | Percent weight |
|---|---|
| $SiO_2$ | 60–70 |
| ZnO | 9–12 |
| $Al_2O_3$ | 1 |
| $Na_2O$ | 5–15 |
| $B_2O_3$ | 1 |
| CaO | 5–15 |
| MgO | 1 |

References Cited

UNITED STATES PATENTS

| | | |
|---|---|---|
| 3,201,266 | 8/1965 | MacDowell. |
| 3,380,838 | 4/1968 | Sack _____ 117—129 XR |
| 3,397,076 | 8/1968 | Little et al. _____ 117—129 XR |
| 3,406,279 | 10/1968 | Ziver. |
| 3,434,791 | 3/1969 | Hayashi et al. |

DAVID KLEIN, Primary Examiner

U.S. Cl. X.R.

106—39; 220—64